(12) United States Patent
Manda et al.

(10) Patent No.: US 7,165,241 B2
(45) Date of Patent: Jan. 16, 2007

(54) MECHANISM FOR TESTING EXECUTION OF APPLETS WITH PLUG-INS AND APPLICATIONS

(75) Inventors: Vijayram Manda, San Jose, CA (US); Gemma G. Riner, Fremont, CA (US); Sridhar V. Enugula, Fremont, CA (US); Rajendrakumar Pallath, Mountain View, CA (US); Wanyee A. Chow, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 664 days.

(21) Appl. No.: 10/306,870

(22) Filed: Nov. 26, 2002

(65) Prior Publication Data

US 2004/0103394 A1    May 27, 2004

(51) Int. Cl.
   *G06F 9/44*     (2006.01)
   *G06F 11/00*    (2006.01)
(52) U.S. Cl. .................. 717/124; 717/126; 717/176; 714/38
(58) Field of Classification Search ............... 717/126, 717/176, 124; 715/513; 714/4, 38; 702/186
   See application file for complete search history.

(56) References Cited

U.S. PATENT DOCUMENTS

| 5,022,028 | A |   | 6/1991  | Edmonds et al. |
| 5,669,000 | A |   | 9/1997  | Jessen et al. |
| 5,784,553 | A | * | 7/1998  | Kolawa et al. ............... 714/38 |
| 5,905,856 | A |   | 5/1999  | Ottensooser |
| 6,011,916 | A | * | 1/2000  | Moore et al. ............... 717/104 |
| 6,353,897 | B1 | * | 3/2002  | Nock et al. .................... 714/38 |
| 6,473,894 | B1 | * | 10/2002 | Shrader et al. ............. 717/126 |
| 6,510,402 | B1 | * | 1/2003  | Logan et al. ............... 702/186 |
| 6,571,389 | B1 | * | 5/2003  | Spyker et al. .............. 717/176 |
| 6,604,209 | B1 |   | 8/2003  | Grucci et al. |
| 6,654,911 | B1 | * | 11/2003 | Miles ........................ 714/38 |

(Continued)

OTHER PUBLICATIONS

Borland Software Corporation, JBuilder 5.0, 2001, 220 pages (57 pages extracted). [Online] [Retrieved at] <portal.aauj.edu/portal_resources/downloads/web/web_applications_developers_guide.pdf>.*

(Continued)

*Primary Examiner*—Tuan Dam
*Assistant Examiner*—Thuy Dao
(74) *Attorney, Agent, or Firm*—Hickman Palermo Truong & Becker LLP

(57) ABSTRACT

A mechanism for testing execution of applets with plug-ins and applications is described. In one embodiment, a data structure that specifies at least two applets of a plurality of applets is accessed. Based on the data structure that specifies the two applets, a plug-in that executes with an application is caused to attempt to execute each of the two applets. After causing the plug-in to attempt to execute the two applets, results are generated based on the attempt to execute each of the two applets. The mechanism may be implemented to test multiple test suites that each comprise one or more test cases that each include an applet, and reports may be generated for individual test cases, test suites, or a set of test suites. This embodiment of the present invention minimizes the time required for testing and allows for testing the effects of applets that are not visible to a user.

52 Claims, 3 Drawing Sheets

U.S. PATENT DOCUMENTS

| | | | |
|---|---|---|---|
| 6,983,400 B1 | 1/2006 | Volkov | |
| 6,993,682 B1 | 1/2006 | Corrie | |
| 6,993,747 B1 | 1/2006 | Friedman | |
| 7,020,797 B1* | 3/2006 | Patil | 714/4 |
| 2003/0140089 A1* | 7/2003 | Hines et al. | 709/202 |
| 2003/0196189 A1* | 10/2003 | Wang et al. | 717/124 |
| 2004/0059810 A1* | 3/2004 | Chess et al. | 709/224 |
| 2004/0205565 A1* | 10/2004 | Gupta | 715/513 |
| 2005/0034103 A1 | 2/2005 | Volkov | |

OTHER PUBLICATIONS

Citation Project, Summer 1999, Georgia Institute of Technology, (19 pages extracted). [Online] [Retrieved at] <http://www.cc.gatech.edu/classes/RWL/Projects/citation/Docs/ProjectPage/project.page.html>.*

"Building a Java Software Engineering Tool for Testing Java Applets", Binns et al., 1996, 7 pages. [Online] [Retrieved at] <http://citeseer.ist.psu.edu/binns96building.html>.*

Java World Fueling Innovation entitled, "Plug into Java with Java Plug-in, Learn How Sun's software tool solves the lag time between Java releases and new browser versions", by Jeff Friesen, dated Jun. 1999, (pp. 1-22), http://www.javaworld.com/javaworld/jw-06-1999/jw-06-plugin_p.html.

Get Java™ Technology entitled "What Java Plug-in Is" (1 pg) and "Frequently Asked Questions" (4 pgs), dated Mar. 19, 2002, http://java.sun.com/getjava/what.html and http://java.sun.com/getjava/java-faq.html.

Java™ Plug-in Product, entitled "Java™ Plug-in 1.4 Product Now Available", (pp. 1-4), dated Mar. 19, 2002, http://java.sun.com/products/plugin/index-1.4.html.

NNRD428181—IBM Technical Disclosure Bulletin "Testharness for use in a distributed environment," Dec. 1999, UK.

\* cited by examiner

MECHANISM FOR TESTING EXECUTION OF APPLETS WITH PLUG-INS AND APPLICATIONS

FIELD OF THE INVENTION

The invention relates generally to computer systems, and more particularly to a mechanism for testing execution of applets with plug-ins and applications.

BACKGROUND OF THE INVENTION

The approaches described in this section are approaches that could be pursued, but not necessarily approaches that have been previously conceived or pursued. Therefore, unless otherwise indicated, the approaches described in this section are not prior art to the claims in this application and are not admitted to be prior art by inclusion in this section Applications that are used with computing systems can be enhanced or extended by using plug-in applications, also commonly referred to simply as "plug-ins." As used herein, the term "plug-in" refers to an auxiliary application that works with another application to enhance one or more features or capabilities of the other application. For example, plug-ins are often used with Web browser applications to provide support for additional types of Web page content, such as audio, video, etc. A plug-in is typically referenced by a special hypertext markup language (HTML) tag on a Web page, and when the Web browser loads the Web page, the browser retrieves and executes the code for the plug-in. Plug-ins often refer to auxiliary applications in software, but may also refer to auxiliary applications implemented in hardware or implemented through a combination of hardware and software.

Applications can be enhanced or extended by using applet applications, also commonly referred to simply as "applets." As used herein, the term "applet" refers to an application that has limited capabilities as compared to typical applications. For example, an applet may contain one or a few number of features, require limited memory, be limited in size, be portable among different operating systems, or may include one or more of such characteristics. Applets are commonly distributed with Web pages and are executed using Web browsers. Applets are typically executed by a plug-in that operates in conjunction with the Web browser.

Examples of applets include Java applets that are based on the Java programming language. An example of a plug-in is the Java Plug-in that is provided by Sun Microsystems. The Java Plug-in allows applets included in Web pages to be executed using Sun's Java 2 Runtime Environment, Standard Edition (J2RE) instead of the default Java virtual machine (JVM) that is included in a Web browser. Examples of Web browsers include Netscape Navigator and Microsoft Internet Explorer. The use of the Java Plug-in allows users of Web browsers to use a more current version of the JVM than the default JVM included in the user's particular version of their Web browser because a newer version of the Java Plug-in can be obtained and installed more easily than obtaining and installing a new Web browser version.

The applets and plug-ins that are executed with an application are generally independent of the "operating environment" used to execute the applets and plug-ins. As used herein, the term "operating environment" refers to one or more parameters that can affect the execution of the applets, plug-ins, and applications, including but not limited to, one or more of the following: the particular application, the particular version of the application, the operating system, and the hardware platform that executes the particular application. For example, the operating environment may include version 2.0 of the Netscape Navigator Web browser running on an Intel-based computer that uses the Microsoft Windows XP operating system.

Although applets and plug-ins are designed to be independent of the operating environment, the differences in applications, application versions, operating systems, and hardware platforms may lead to differences when executing applets and plug-ins in different operating environments. As a result, developers of applets and plug-ins test their products in many different operating environments. Similarly, developers of applications test their products to ensure that the applications correctly execute different applets and plug-ins in different operating environments.

One problem with such testing of applets, plug-ins, and applications in different operating environments is the large number of potential tests based on the many different combinations of operating environment parameters, such as the number of different applications, application versions, operating systems, hardware platforms, applets, applet versions, plug-ins, and plug-in versions. As a result of so many different parameters, the number of different operating environments are often at least in the dozens, if not hundreds. Although not all operating environments are always supported, the supported number can still be considerable, and therefore the testing effort is significant.

One approach for testing applications in different operating environments is to execute a number of test cases in each operating environment. For example, to test a set of five applets with a particular version of the Java Plug-in, a user can use a Web page that includes a link to each of the five applets. By clicking on each link to each applet, the user can execute the set of applets, thereby testing whether the applets are successfully executed by the Java Plug-in.

However, there are several disadvantages to this approach. For example, the user manually executes each applet by clicking on each link to each applet used in testing. For tests that involve a large number of applets, the time required for a user to click on each link to each applet can be considerable. Furthermore, the time required for testing rapidly increases as the number of operating environments increases. It is not uncommon for a user to need several days to execute a full testing sequence for a set of operating environments. Finally, the user may make mistakes in running a series of test cases, resulting in some cases not being executed, other cases being executed multiple times, or some cases being improperly executed. This can be a problem when the same test cases are used later to test another set of conditions (e.g., to test another plug-in or application) because the test cases may not be run the second time in the same way as the first time. This can lead to differences in the test results that are due to the testing process, not the things being tested.

Another problem with this approach is that applets often work "behind the scenes" with the application. For example, applets that run with a plug-in for a Web browser may add capabilities to the Web browser that are not visible to the user. As a result, the user may be unable to determine whether or not the applet was successfully executed.

Based on the foregoing, there exists a need for a mechanism for testing execution of applets with plug-ins and applications that minimizes the time required for the testing. There also exists a need for a mechanism for testing execution of applets with plug-ins and applications that allows for a determination to be made whether the applet was successfully executed with the plug-in and application when the effect of executing the applet is not visible to a user.

SUMMARY

To overcome the shortcomings of prior approaches, one embodiment of the present invention provides a mechanism for testing execution of applets with plug-ins and applications. In one embodiment, a data structure that specifies at least two applets of a plurality of applets is accessed. Based on the data structure that specifies the two applets, a plug-in that executes with an application is caused to attempt to execute each of the two applets. After causing the plug-in to attempt to execute the two applets, results are generated based on the attempt to execute each of the two applets. The mechanism may be implemented to test multiple test suites that each comprise one or more test cases that each include an applet, and reports may be generated for individual test cases, test suites, or a set of test suites.

One embodiment of the present invention minimizes the time required for testing by automatically testing a plurality of test cases without requiring manual execution of the test cases by a user and allows for testing the effects of applets that are not visible to a user that otherwise are not observable in the prior approaches. Thus, this embodiment of the present invention provides an improved mechanism for testing execution of applets with plug-ins and applications.

BRIEF DESCRIPTION OF THE DRAWINGS

The present invention is depicted by way of example, and not by way of limitation, in the figures of the accompanying drawings and in which like reference numerals refer to similar elements and in which.

DETAILED DESCRIPTION OF EMBODIMENTS

A mechanism for testing execution of applets with plug-ins and applications is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are depicted in block diagram form in order to avoid unnecessarily obscuring the present invention.

In the following description, the various functions shall be discussed under topic headings that appear in the following order:

I. STRUCTURAL AND FUNCTIONAL OVERVIEW
II. USING A TRIGGER TO EXECUTE A TEST SUITE BY INVOKING A RUNNER AND TO INVOKE A REPORTER
  A. Trigger Input, Variables, and Values
  B. Trigger Functions and Configuration Files
III. USING A RUNNER TO EXECUTE A TEST SUITE BY INVOKING A SCHEDULER AND TO GENERATE INTERMEDIATE REPORTS
IV. USING A SCHEDULER TO EXECUTE TEST CASES IN A TEST SUITE BY INVOKING CLIENTS
V. USING A CLIENT TO EXECUTE A TEST CASE AND GENERATE A TRACE FILE
VI. USING A REPORTER TO GENERATE A FINAL REPORT BASED ON INTERMEDIATE REPORTS
VII. IMPLEMENTATION MECHANISMS
VIII. EXTENSIONS AND ALTERNATIVES

I. Structural and Functional Overview

Figure 1:
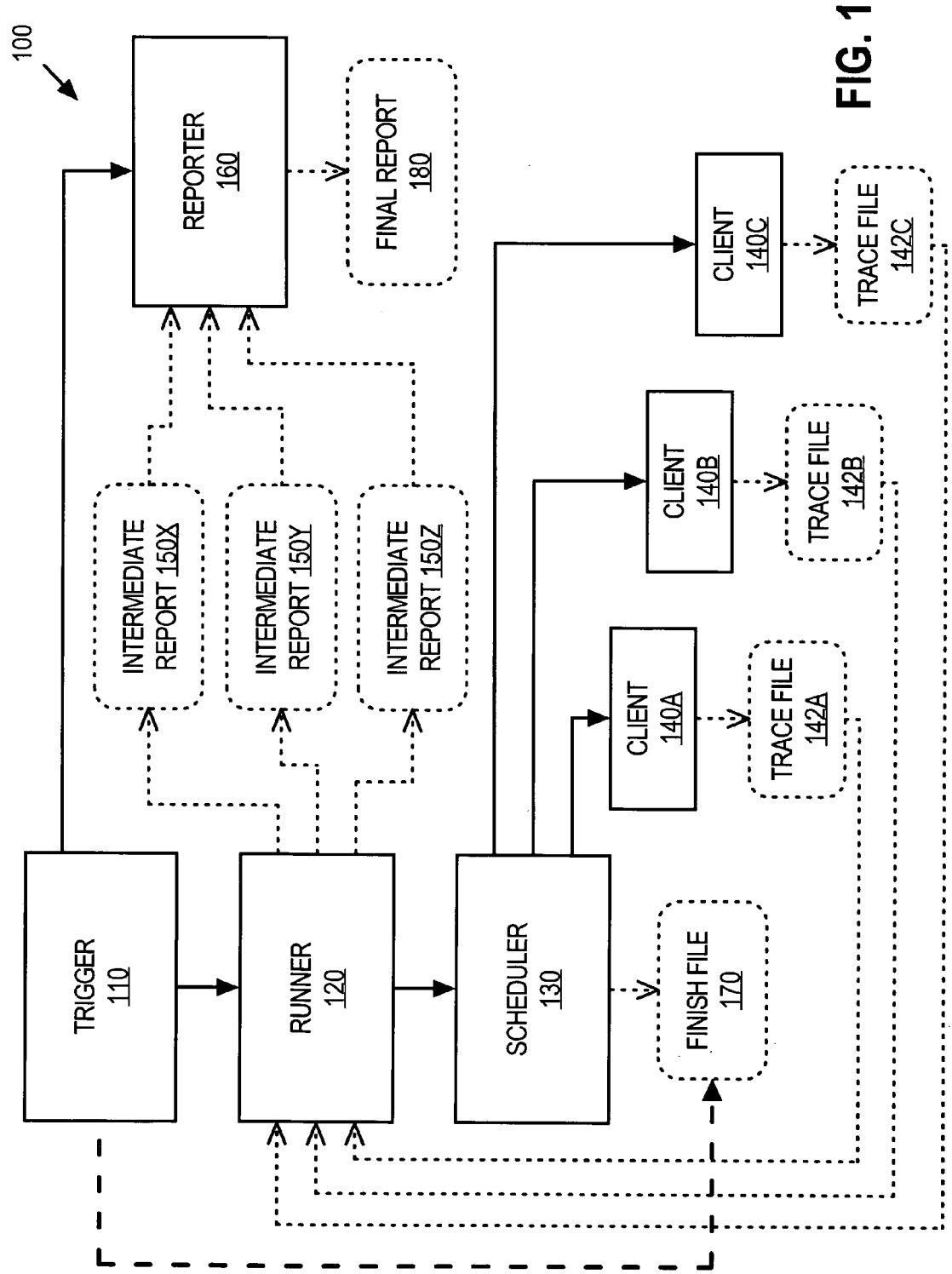
FIG. 1 is a block diagram that depicts a high level overview of one embodiment of a mechanism for testing execution of applets with plug-ins and applications.

FIG. 1 is a block diagram 100 that depicts a high level overview of one embodiment of a mechanism for testing execution of applets with plug-ins and applications. FIG. 1 is described with reference to three test suites (not shown), and each test suite is comprised of three test cases (also not shown), although any number of test suites each having one or more test cases can be used. Specifically, FIG. 1 is described in the context of three test suites X, Y, Z, and in which test suite X includes applets A, B, C, as the test cases, and each test case is executed by a Java Plug-in that executes with a Web browser, although other types of plug-ins and applications can be used.

Block diagram 100 includes a trigger 110, a runner 120, a scheduler 130, clients 140A, 140B, 140C, and a reporter 160. Block diagram 100 also includes trace files 142A, 142B, 142C, intermediate reports 150X, 150Y, 150Z, a finish file 170, and a final report 180.

Trigger 110 may be implemented as a shell script that invokes runner 120 and reporter 160 based on an input text file (not shown) that lists test suites X, Y, Z. Runner 120 may be implemented as a Java based application that invokes scheduler 130 for each of test suites X, Y, Z, and generates intermediate reports 150X, 150Y, 150Z, after executing test suites X, Y, Z, respectively.

Scheduler 130 may be implemented as an instance of the Web browser application that loads an HTML page that lists the test cases for a test suite in a JavaScript-controlled HTML list box for the test suite. Scheduler 130 invokes a client 140A, 140B, 140C for each test case in the a suite. Thus, in the current example, scheduler 130 invokes client 104A to execute applet A, invokes client 140B to execute applet B, and invokes client 140C to execute applet C. In one embodiment, scheduler 130 is run in one window, while the clients 140A, 140B, 140C are run one after the other in a second window. Thus, client 140A is run first in the second window; client 140B is then run in the second window; and client 140C is then run in the second window.

Trace files 142A, 142B, 142C are generated by clients 140A, 140B, 140C, respectively, as they execute each test case. Trace files 142A, 142B, 142C store the results of executing the test cases. For example, applet A may include a set of one or more criteria to determine whether applet A has been successfully executed by the Java Plug-in with the Web browser application. The one or more criteria may be satisfied if applet A was successfully executed. Trace file 142A is used to record the result of the test as a "PASSED" or a "FAILED" depending on whether or not the test criteria were satisfied. Similarly, trace files 142B, 142C are used to record the results of testing applets B and C, respectively.

Finish file 170 is generated after execution of the test cases in a test suite has completed. For example, when clients 140A, 140B, 140C have been executed to test applets A, B, C, and trace files 142A, 142B, 142C are generated, finish file 170 is generated and stored on a persistent storage device, such as a hard disk. In one embodiment, when scheduler 130 is done with all of the test cases in a test suite, it loads a last HTML page, which invokes a finish applet. It is the finish applet that generates the finish file 170.

Intermediate reports 150X, 150Y, 150Z are generated by runner 120 after each of test suites X, Y, Z are executed, respectively. For example, intermediate report 150X can be generated by runner 120 based on trace files 142A, 142B, 142C following completion of test suite X. Intermediate report 150X may indicate the number of test cases with a "PASSED," the number of test cases with a "FAILED," and whether or not the test suite "PASSED" or "FAILED." Intermediate reports 150Y, 150Z are similarly generated based on the results of test suites Y, Z, respectively.

Final report 180 is generated by reporter 160 based on intermediate reports 150X, 150Y, 150Z. For example, final report 180 may indicate the number of test suites that "PASSED," the number that "FAILED," and whether the set of test suites X, Y, Z "PASSED" or "FAILED."

Note that while FIG. 1 is described with reference to several enumerated mechanisms, such as trigger 110, runner 120, scheduler 130, clients 140A, 140B, 140C, and reporter 160, fewer or more mechanisms may be included. For example, the functions performed by a particular mechanism in FIG. 1 may be divided among one or more mechanisms, including among the other mechanisms depicted in FIG. 1 and additional mechanisms not depicted. Furthermore, the functions of two or more mechanisms of FIG. 1 may be performed by the same mechanism. In general, any mechanism, including but not limited to those of FIG. 1, may perform one or more of the functions described herein.

Figure 2:
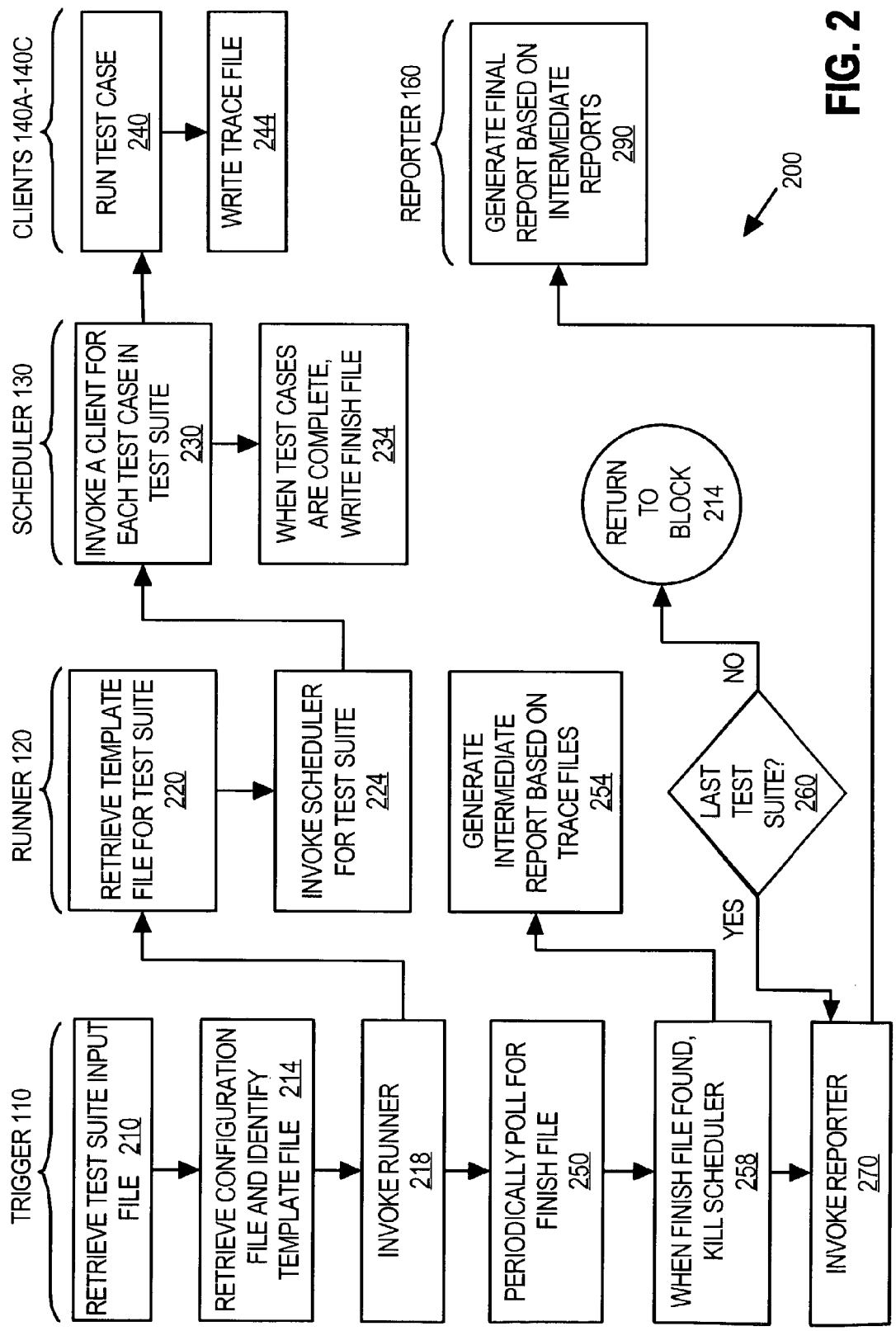
FIG. 2 is a flow diagram that depicts a high level overview of one embodiment of a mechanism for testing execution of applets with plug-ins and applications.

FIG. 2 is a flow diagram 200 that depicts a high level overview of one embodiment of a mechanism for testing execution of applets with plug-ins and applications. While FIG. 2 is described with reference to FIG. 1, the embodiment of FIG. 2 is not limited to the structural elements of FIG. 1. Furthermore, while FIG. 2 depicts a particular set of blocks and functions in a particular order, fewer or more blocks and different orders may be used in a particular implementation.

In block 210, trigger 110 retrieves an input file for a test suite. For example, trigger 110 may be executed in response to command line input from a user, and the input may specify the name and/or location of the input file for the test suite. The input file specifies one or more test suites, such as test suites X, Y, Z. The command line input may include one or more additional data items that specify the plug-in, such as the Java Plug-in, the application, such as the Netscape Navigator or Microsoft Internet Explorer Web browsers, and the versions of the plug-in and application.

In block 214, trigger 110 retrieves a configuration file and identifies a template file for the first test suite specified in the input file for the test suite that is retrieved in block 210. For example, configuration files may be provided for each test suite X, Y, Z. Each configuration file may include a list of template files, with each template file corresponding to a particular set of input values, such as the Web browser application type and output desired. Based on the input, trigger 110 identifies the proper template file from the set of template files that are specified in the configuration file.

In block 218, trigger 110 invokes runner 120. For example, for the first test suite X, trigger 110 may invoke runner 120 as an instance of the Web browser application specified by the user and then pass the location of the template file that is identified in block 214 to runner 120.

In block 220, runner 120 retrieves the template file identified by trigger 110 for the test suite. For example, for the first test suite X, runner 120 receives the proper template file for test suite X that was identified in block 214. Each template file may be a JavaScript HTML Web page that lists the test cases in a JavaScript-controlled HTML list box, such as applets A, B, C, for test suite X.

In block 224, runner 120 invokes scheduler 130 for the test suite. For example, runner 120 may invoke scheduler 130 as an instance of the Web browser application specified by the user via the command line input, and load the template file for test suite X into the instance of the Web browser.

In block 230, scheduler 130 invokes a client for each test case in the test suite. For example, for test suite X, the instance of the Web browser that was invoked in block 224 invokes clients 142A, 142B, 142C for applets A, B, C, in test suite X. In one embodiment, clients 142A, 142B, 142C are invoked one after the other in one window of the Web browser application.

In block 240, clients 140A, 140B, 140C run each test case. For example, client 140A executes applet A, client 142B executes applet B, and client 142C executes applet C.

In block 244, clients 140A, 140B, 140C write trace files 142A, 142B, 142C, respectively. For example, based on the set of testing criteria included in applet A, client 140A writes trace file 142A that indicates whether the test with applet A was a "PASSED" or a "FAILED."

In block 234, scheduler 130 causes finish file 170 to be generated when the test cases are complete. For example, after clients 140A, 140B, 140C have completed running applets A, B, C, and written trace files 142A, 142B, 142C, scheduler 130 causes finish file 170 to be created. In one embodiment, when scheduler 130 is done with all of the test cases in a test suite, it loads a last HTML page (Closewin.html), which invokes a finish applet. It is the finish applet that generates the finish file 170.

In block 250, trigger 110 periodically polls for finish file 170. For example, after invoking runner 120 in block 218, trigger 110 may begin to periodically check for the presence of finish file 170.

In block 258, trigger 110 kills scheduler 130 when finish file 170 is found. For example, trigger 110 may terminate the instance of the Web browser application that is executing the template file for test suite X, thereby killing any of the instances of the Web browser that are executing as clients 140A, 140B, 140C that may be still executing.

In block 254, runner 120 generates an intermediate report based on the trace files for the test suite. For example, for test suite X, runner 120 generates intermediate report 150X based on trace files 142A, 142B, 142C. After generating the intermediate report, runner 120 terminates execution.

In block 260, a determination is made whether the last test suite has been executed. If so, the approach continues to block 270 that is described below. If not, the approach returns to block 214, and the trigger 110 retrieves the configuration file for the next test suite and identifies the proper template file in block 214 before invoking runner 120 for the next test suite in block 218. The determination of whether the last test suite has been executed may be made in one or more ways, such as by runner 120 before runner 120 terminates execution following the generation of intermediate report 150X or by trigger 110 after runner 120 terminates execution.

In block 270, trigger 110 invokes reporter 160.

In block 290, reporter 160 generates a final report based on the intermediate reports. For example, reporter 160 may generate final report 180 based on intermediate reports 150X, 150Y, 150Z.

Note that a particular test may fail due to a variety of reasons, including but not limited to, problems with the test case (e.g., the applet), the plug-in, or the application. As a result, the testing approach described herein can be used to test new versions of applets, plug-ins, or applications. Furthermore, a test case may fail due to a combination of parameters, such as the combination of a particular applet and application version, a plug-in and an application type, etc. As a result, the testing approach described herein can be used to test different combinations of applets, plug-ins, and applications. Furthermore, test results can be affected by other parameters, such as the operating system and hardware platform. As a result, the testing approach described herein can be used to test new operating systems, operating system versions, hardware platforms, or particular hardware changes or variations. Thus, in general the testing approach described herein can be used to test any parameter, application, or anything else that can effect the execution of a test.

II. Using a Trigger to Execute a Test Suite by Invoking a Runner and to Invoke a Reporter According to one embodiment, an application is used to initiate testing of the execution of applets with plug-ins and applications. For example, the application may be referred to as a "trigger," and the trigger is initiated by a user to begin the testing process. The user may initiate the trigger using input, such as that provided via a command line or a graphical user interface. The trigger is typically implemented as a stand alone application, such as a shell script or as a Java application. As a specific example, the trigger may be implemented as a Korn shell script on a computer running the Unix Operating System.

The trigger remains running until the end of the testing process, although other applications as described herein may be initiated directly or indirectly by the trigger. For example, the trigger may invoke a runner application as described herein for each test suite to be used and a reporter application to generate a final report.

A. Trigger Input, Variables, and Values

The input from the user may initiate the trigger, with other required inputs retrieved from one or more other data structures, such as a file stored on a fixed disk or other type of persistent storage device or from a transient storage device, such as memory. The input information may identify a number of parameters, including but not limited to, one or more test cases, a plug-in, and an application. Optionally, the input information may identify other items and options, such as the versions of the plug-in and application, working directories to store trace files, report files, and other data structures generated or used during the testing process, and testing options, such as checking reliability (e.g., the ability of the tests to be repeatedly executed, which is discussed more fully below).

Below is an example of a text file named "test.txt" that contains input variables and input values for a trigger. The particular input variables, input values, and organization depicted in the "test.txt" file are for illustration only, and fewer or more input variables and different input variables and values may be used besides those described herein.

```
WORK_DIR=Y:/TESTDIR
JAVA_HOME=C:/JDK1.3
RES_DIR=Y:/TESTDIR/REPORT/TEST
BROWSER_TYPE=NS
BROWSER_VERSION=4.78
TEST_JRE_VERSION=1.4
RELIABILITY=YES
```

-continued

```
RELIABLETIME=100
TEST_CYCLE=QL
```

The variable "WORK_DIR" specifies a working directory for the testing process. The working directory may contain other files, such as configuration files and template files, which are discussed below. In the example above, the working directory is specified to be "Y:/TESTDIR".

The variable "JAVA_HOME" specifies the location of a Java version (e.g., a particular Java Virtual Machine, or JVM) that is suitable for use in executing a runner application. For example, the example above has an input value of "C:/JDK1.3" that points to version 1.3 of the Java Development Kit (JDK). The Java version specified might be a version that is known to be stable based on past use and testing, as compared to another Java version or Java Plug-in that is to be tested. As a result, when the goal of the testing is to test a different Java Plug-in, the Java version specified by "JAVA_HOME" is typically different than that specified by "TEST_JRE_VERSION", which is discussed below.

The variable "RES_DIR" specifies the location of a result directory for holding files such as trace files, intermediate reports, and final reports. In the example above, the result directory is specified to be "Y:/TESTDIR/REPORT/TEST".

The variable "BROWSER_TYPE" specifies the browser type to be used for testing. In the example above, the input value is "NS" to denote the Netscape Navigator browser application. Other input values may be used, such as "IE" to denote the Microsoft Internet Explorer application.

The variable "BROWSER_VERSION" specifies the version of the specified browser to be used for testing. In the example above, the input value is "4.78" to denote version 4.78 of Netscape Navigator.

The variable "TEST_JRE_VERSION" specifies the version of the plug-in to be used for testing. In the example above, the input value is "1.4" which specifies version 1.4. A particular computer may have more than one version of a plug-in installed, and this input variable allows the user to specify a particular version from the versions that are available. In addition, even if the computer has not had the specified plug-in version installed, the trigger can be configured to install the specified version before running any test cases or test suites. Note that in this example, the plug-in is not specified because the input assumes that the plug-in is the Java Plug-in. However, in other implementations, a plug-in type input variable may be used to specify the type of plug-in. Note also that a plug-in version need not be specified, nor even a plug-in version variable used, and as a result, the most recent installed plug-in version or a default version would be used.

The variable "RELIABILITY" specifies the reliability option. The testing of reliability is performed by repeatedly executing each test case until one or more criteria are satisfied. Reliability testing is different than functional testing, which determines whether a test can be executed and therefore usually executes each test case one time. Reliability testing is also different from performance testing, which determines performance measures such as speed, efficiency, resources used, etc. In the example above, the input value is "YES" to indicate that reliability testing is to be performed. The input value could also be "NO" to indicate that no reliability testing is to be performed. Note also that this input value, or any other, can be blank to specify that a default value is to be used, such as to not perform reliability testing.

The variable "RELIABLETIME=100" specifies the time for the reliability testing. In the example above, the input value is "100" that specifies that reliability testing is to be performed for each test case for one hundred seconds.

The variable "TEST_CYCLE" specifies the output option. In the example above, the input value is "QL" that specifies that a "quick look" is desired, in contrast to a "full look (FL)". In one embodiment, a quick look set of test results is a subset of the full look set of test results. Quick look tests test the breadth-wise functionality of a plug-in, whereas full look tests test the depth-wise functionality of a plug-in.

Note that variations on the input discussed above may be implemented, including but not limited to, testing multiple browser types, multiple browser versions, multiple plug-ins and plug-in versions. For example, the trigger can accept command line input options that modify the input subsequently retrieved from a stored file, such as by specifying that particular test cases be executed instead of all test cases in a test suite as would normally be done.

According to one embodiment, the trigger obtains input that identifies one or more test suites to be used for testing. For example, the working directory may include a test suite input file, called "properties.txt", that lists a set of test suites to be used for testing. As other examples, another input variable may be used to specify the test suite input file, or the test suite input file may be specified as a command line argument when the trigger is executed. Each test suite may be identified using a feature name that is representative of the feature exercised by the test cases in the test suite.

According to yet another embodiment, a set of inputs can be provided and one or more test cases can be executed based on one or more combinations of the inputs. For example, the input can include a list of browser types, browser versions for one or more of the browser types, one or more operating systems, one or more hardware platforms, one or more plug-in types, and one or more versions of each plug-in type. The trigger can then determine how many different combinations of the inputs are possible, such as how many different combination of inputs can be created based on the browser types, browser versions, application types, application versions, operating systems, hardware platforms, plug-in types, and plug-in versions. The test case or cases, or test suite or test suites, can then be executed for one or more of the different combinations of such inputs, and the reporter can summarize the results based on the different combinations of inputs. Each combination of such inputs may be described as defining an "operating environment" or "testing environment."

B. Trigger Functions and Configuration Files

The trigger performs a number of functions, including but not limited to those described herein. For example, the trigger can be configured to make a specified number of attempts, such as three, to load and launch the plug-in version and application version specified in the input. If the plug-in and application are successfully loaded and launched, the testing process continues. Otherwise, the testing process ends, and a suitable error message or report can be generated.

The main function of the trigger is to invoke the runner and monitor the execution of the test cases. For example, the trigger can invoke the runner at the start of testing each test suite. For a particular test suite, the trigger retrieves a corresponding configuration file. Based on the configuration file, the trigger identifies the appropriate template file to be used for the test suite and passes the template file to the runner. Alternatively, the trigger passes the location or identify of the template file to the runner, and the runner retrieves the template file.

Below is an example of a configuration file called "config.txt" for a feature called "FEATURE X". The particular input variables, input values, and organization depicted in the "config.txt" file are for illustration only, and fewer or more items and different values may be used besides those described herein.

```
5|QL|NS|FEATURE X|http://sun.com/x1.html
3|QL|IE|FEATURE X|http://sun.com/x2.html
5|FL|NS|FEATURE X|http://sun.com/x3.html
4|FL|IE|FEATURE X|http://sun.com/x4.html
```

The first item in each line of the configuration file "config.txt" above is a numerical value that specifies the number of test cases in the test suite. The second item is a variable that specifies the output option. In this example, both "quick look (QL)" and "full look (FL)" output options are supported. The third item is a variable that specifies the browser type. In this example, the supported browser types are Netscape Navigator (NS) and Microsoft Internet Explorer (IE), although fewer or more browser types can be used in other implementations. The fourth item is an arbitrary text description of the feature, which in this example is "FEATURE X". Finally, the fifth and last item is the path to an HTML file that contains the test cases that correspond to the particular combination of quick look/full look and browser type values. For example, the path for "http://sun.com/x2.html" points to an HTML template file with three test cases for "FEATURE X" for use with the Internet Explorer Web browser application and for which a "quick look" report is to be generated.

Once the trigger has retrieved the configuration file, the path to the HTML file for the test cases to be used is identified based on the browser type specified in the "test.txt" input file and the output option. For example, in the previous input example, the input value for the browser type variable is "NS" and the input value for the output variable is "QL", therefore the "x1.html" template file will be used for the test suite for testing "FEATURE X". The trigger may either retrieve the appropriate template file and pass the template file to the runner, or simply pass the path for the template file to the runner so that the runner can retrieve the template file.

After the trigger invokes the runner, the trigger begins polling for the presence of a "finish file" or some other indication that the testing for the test suite is complete. For example, the trigger can periodically check for the presence of a "finish.txt" file that is written by the scheduler upon completion of all the test cases in the test suite. In addition, at the start of the polling for the finish file, the trigger may begin a clock or timer. If the finish file is not found by the expiration of the clock or timer, the trigger proceeds on as if the finish file had been found. The clock or time therefore handles the situation in which for some reason the finish file is not created, such as when an error occurs with the runner or scheduler or one of the clients that prevents the creation of one or more trace files or the finish file.

When the finish file is found, the clock or time expires, or some other criterion is satisfied, the trigger terminates, or "kills," the scheduler, thereby allowing control to return to the runner to allow the runner to generate an intermediate report for the test suite based on the trace files written by the clients. If any clients are still executing or have failed to terminate normally, such clients will be killed when the scheduler is killed since the clients are additional instances of the same application used to execute the scheduler.

After the runner completes execution and terminates, the trigger invokes the reporter application that generates the final report. Upon killing the scheduler, the trigger can begin a new clock or timer in the event an error occurs that prevents the runner from generating the intermediate report and terminating normally.

III. Using a Runner to Execute a Test Suite by Invoking a Scheduler and to Generate Intermediate Reports According to one embodiment, an application is used to initiate testing of one or more applets with plug-ins and applications. For example, the application may be referred to as a "runner," and the runner is invoked by the application that initiates the testing process, such as a trigger. The runner is typically implemented as a stand along application, such as a shell script or as a Java application. As a specific example, the runner may be implemented as a Java application executed using a JVM that is known from previous use and testing to be stable. By using such a known stable version instead of an untested JVM for the runner, errors that might occur due to the runner may be minimized.

The trigger can pass the identity or location of the template file for the particular test suite to be executed to the runner. Alternatively, the trigger can retrieve the template file and pass the template file to the runner. As yet another alternative, the trigger can pass the identity of the test suite to the runner, and then the runner can retrieve the appropriate configuration file, identify the proper template file from the configuration file, and then retrieve the template file.

After the runner has retrieved the proper template file for the test suite, the runner invokes the scheduler based on the template file.

After the scheduler has executed each test case by invoking the clients, or at least attempted to execute each test case, and written the finish file, been timed out by the trigger, or satisfied some other criterion, the trigger terminates the scheduler and control returns to the runner.

The runner then generates results for the test suite, such as in an intermediate report based on the trace files that are generated by the clients. For example, the intermediate report may list the result of each test case in the test suite, indicating whether each applet was successfully loaded or not, such as by listing each test case by name or number with either a "PASSED" or a "FAILED" indication. The result for each test case is determined by the runner based on the trace file for each test case, such as by retrieving each trace file and identifying the status line that indicates the result of the test case. If a test case failed such that a trace file was not generated, the runner may indicate the result for that test case as "FAILED."

According to one embodiment, the results for the test suite are modified according to an exclude list. For example, a file called "exclude.txt" may be used to list known failures, such as that test case five of test suite X is known to fail for Netscape Navigator version 4.78 with Java Plug-in version 1.4. The runner can check the failed test cases against the exclude list to identify whether any failed test cases are a known failure. For any test cases on the exclude list, the runner can change the result for the test case from "FAILED" to "PASSED" or some other indication, such as "EXCLUDED." As a result, known failures are accounted for in the results for the test suite, and the intermediate report only reflects test cases that "FAILED" due to unknown failures.

IV. Using a Scheduler to Execute Test Cases in a Test Suite by Invoking Clients According to one embodiment, an application is used to schedule the testing of one or more applets. For example, the application may be referred to as a "scheduler," and the scheduler is invoked by the application that initiates testing of one or more applets, such as the runner. The scheduler is typically implemented as an instance of the application that is part of the testing, such as an instance of a Web browser application. The one or more test cases are identified based on a template file, such as an HTML file that lists the applets for a particular test suite. As a specific example, the scheduler may be implemented using an instance of the application type and version specified in the input, such as a particular version of a specified Web browser application, and the template file may be a JavaScript-based HTML Web page that refers to one or more applets to be tested with the particular browser.

Below is an example of a portion of a template file called "x1.html" that was previously identified as discussed above. The "x1.html" file lists each of the five applets, or test cases, for the test suite for "FEATURE X" in a JavaScript list box.

```
x1.html
    <HTML>
        <OPTION> Test1.html
        <OPTION> Test2.html
        <OPTION> Test3.html
        <OPTION> Test4.html
        <OPTION> Test5.html
        <OPTION> Closewin.html
    </HTML>
```

Each of the "Testn.html" references identifies a particular applet for that test case. The scheduler executes the test cases by instantiating a browser window, and then executing each test case one after the other in that window. For the example shown above, the scheduler instantiates a window, and then executes each of the applets identified in the JavaScript list box in that window.

In addition to listing the test cases, the template file includes a reference to a "Closewin.html" file that is used to generate the indication that the test suite has been executed, such as by creating a "finish file."

According to one embodiment, the scheduler includes a timer that spaces out the execution of the test cases. For example, the test cases may be invoked in clients every ten, twenty, or thirty seconds. Spacing out the execution of the test cases may reduce the contention for shared resources that can occur if the test cases were not spaced out over time. If necessary, the scheduler can use an interval that is long enough to allow each test case to complete executing before invoking the next test case.

V. Using a Client to Execute a Test Case and Generate a Trace File

According to one embodiment, an instance of an application is used to test execution of applets with plug-ins and applications. For example, the instance of the application may be referred to as a "client," and the client is invoked by the application, such as the scheduler, to execute the test case. The client is typically implemented as a window of another application. As a specific example, the client may be a browser window that executes an applet, and the browser window is invoked by a browser, such as when the scheduler is implemented as an instance of a Web browser application that is specified by the input, and the scheduler uses the appropriate template file to execute the test cases for a test suite.

For example, for the test suite for "FEATURE X" discussed above, in which the first test case is included with "Test1.html", the second test case with "Test2.html", etc., the scheduler invokes a browser window, and then tests each test case in that browser window. For each test case, the scheduler uses the appropriate HTML file. Each HTML file includes the applet for the particular test case, which is loaded by the plug-in specified by the input.

According to one embodiment, an applet includes one or more criteria for determining whether the test is successful or not. For example, the applet can include one or more instructions that are only executed if the applet is successfully loaded by the plug-in with the application and is functioning properly. When executed, the one or more instructions cause a trace file to be written, which includes a status line indicated the result of the test case (e.g., whether the test case "PASSED" or "FAILED").

According to another embodiment, a portion of the plug-in monitors the performance of the applet for the test case and generates a result. For example, the Java Plug-in includes a Java console that can monitor the execution of the applet by the plug-in. The Java console can generate a result, such as a trace file discussed above, based on the results of the test case. The result may be based on one or more criteria that are included in the test case. An applet that includes the one or more criteria can generate an indication based on the execution of the test, and then pass the indication to the Java console that then generates the trace file.

VI. Using a Reporter to Generate a Final Report Based on Intermediate Reports According to one embodiment, an application is used to generate a report of the results from execution of a group of applets with plug-ins and applications. For example, the application may be referred to as a "reporter," and the reporter is initiated by another application, such as the trigger. The reporter is typically implemented as a stand-alone application, such as a shell script or as a Java application. The report generated by the reporter may be referred to as a "final report" to distinguish from the "intermediate reports" that may be generated by another application, such as the runner that generates intermediate reports for each test suite, as described above.

For example, the reporter can generate a final report based on the intermediate report for each test suite. While the intermediate reports include the results for the test cases within the test suite and the overall result for the test suite, the reporter can be configured to include results for the test suites without detailed results for the test cases. The final report can therefore be a summary by test suite of the results, and an overall result for the testing performed, with summary information indicating the number of test suites that passed or failed, the result for each test suite, and perhaps summary information for the test cases such as the overall percentage of test cases that passed or failed. The final report can also indicate how many or which test cases were excluded based on the exclude list.

In general, the reporter can be configured to present any or all of the information from the intermediate reports for the test suites and trace files for the test cases or any information that can be generated based on such information. In addition, the final report can include information about the applets used in testing, such as a list of the features tested, and details about the plug-in and/or application used for testing, such as the plug-in type and version and the application type and version. The final report can also include file information, such as the location of the trace files, test cases, and intermediate reports.

VII. Implementation Mechanisms

The approach for testing execution of applets with plug-ins and applications described herein may be implemented in a variety of ways and the invention is not limited to any particular implementation. The approach may be integrated into a computer system or a computing device, or may be implemented as a stand-alone mechanism. Furthermore, the approach may be implemented in computer software, hardware, or a combination thereof.

Figure 3:
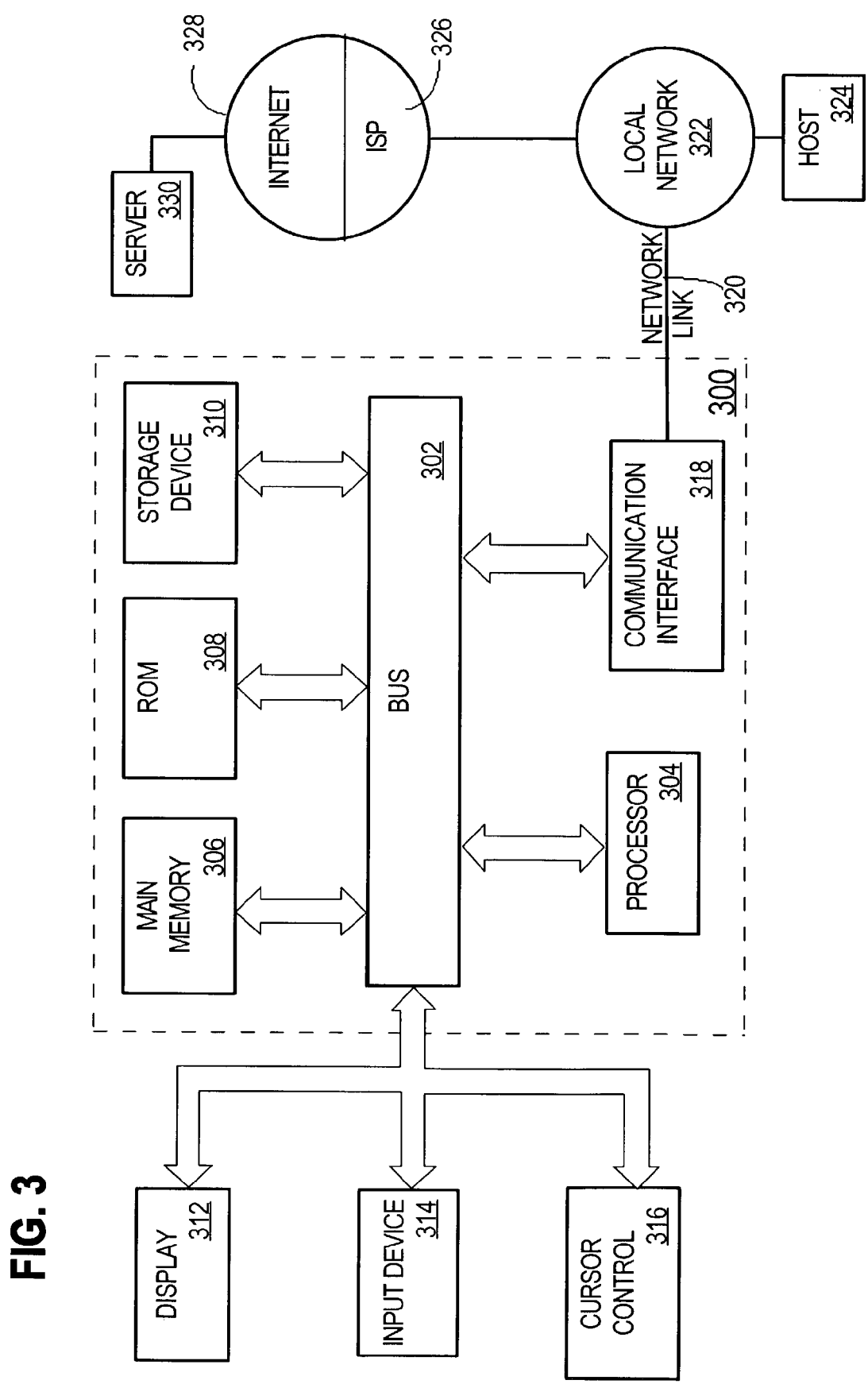
FIG. 3 is a block diagram that illustrates a computer system upon which an embodiment may be implemented.

FIG. 3 is a block diagram that depicts a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

VIII. Extensions and Alternatives

In the foregoing specification, the invention has been described with reference to specific embodiments thereof. It will, however, be evident that various modifications and changes may be made thereto without departing from the broader spirit and scope of the invention. For example, although examples have illustrated the use of Java Plug-ins with Web browser applications, the Java Plug-ins and Web browser applications are used for explanation purposes only as embodiments of the invention are not limited to any particular type of plug-in or application. Thus, the specification and drawings are, accordingly, to be regarded in an illustrative rather than a restrictive sense. The invention includes other contexts and applications in which the mechanisms and processes described herein are available to other mechanisms, methods, programs, and processes.

In addition, in this disclosure, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

What is claimed is:

1. A computer-implemented method for testing execution of applets with plug-ins and applications, the method comprising:

accessing a first data structure that identifies a first test for a first applet of a plurality of applets and a second test for a second applet of the plurality of applets;

based on the first data structure that identifies the first test, causing a plug-in that executes with an application to attempt to execute the first applet;

based on the first data structure that identifies the second test, causing the plug-in that executes with the application to attempt to execute the second applet;

after causing the plug-in to attempt to execute the first applet, generating a first result based on the attempt of the plug-in to execute the first applet;

after causing the plug-in to attempt to execute the second applet, generating a second result based on the attempt of the plug-in to execute the second applet;

accessing a second data structure that identifies a third test for a third applet of the plurality of applets and a fourth test for a fourth applet of the plurality of applets, wherein the second data structure does not identify the first test for the first applet and the second test for the second applet, and wherein the first data structure does not identify the third test for the third applet and the fourth test for the fourth applet;

based on the second data structure that identifies the third test, causing the plug-in that executes with the application to attempt to execute the third applet;

based on the second data structure that identifies the fourth test, causing the plug-in that executes with the application to attempt to execute the fourth applet;

after causing the plug-in to attempt to execute the third applet, generating a third result based on the attempt of the plug-in to execute the third applet;

after causing the plug-in to attempt to execute the fourth applet, generating a fourth result based on the attempt of the plug-in to execute the fourth applet;

wherein:
the first applet and the second applet are included in a first group of applets in the plurality of applets;
the third applet and the fourth applet are included in a second group of applets in the plurality of applets; and the method further comprises:
accessing a third data structure that identifies the first data structure and the second data structure;
wherein accessing the first data structure includes accessing the first data structure based on the third data structure; and
wherein accessing the second data structure includes accessing the second data structure based on the third data structure;

wherein the first data structure is a first file and the second data structure is a second file, and the method further comprises:
retrieving the first file that identifies the first test for the first applet and the second test for the second applet in the first group;
retrieving the second file that identifies the third test for the third applet and the fourth test for the fourth applet in the second group; and
retrieving a third data structure that identifies the plug-in and the application.

2. The method of claim 1, wherein:
the first result specifies whether the attempt of the plug-in to execute the first applet satisfies a first set of one or more criteria;
the second result specifies whether the attempt of the plug-in to execute the second applet satisfies a second set of one or more criteria;
the third result specifies whether the attempt of the plug-in to execute the third applet satisfies a third set of one or more criteria; and
the fourth result specifies whether the attempt of the plug-in to execute the fourth applet satisfies a fourth set of one or more criteria.

3. The method of claim 2, wherein:
the first set of one or more criteria is satisfied when the first applet is executed successfully;
the second set of one or more criteria is satisfied when the second applet is executed successfully;
the third set of one or more criteria is satisfied when the third applet is executed successfully; and
the fourth set of one or more criteria is satisfied when the fourth applet is executed successfully.

4. The method of claim 3, wherein the first applet includes the first set of one or more criteria, the second applet includes the second set of one or more criteria, the third applet includes the third set of one or more criteria, and the fourth applet includes the fourth set of one or more criteria.

5. The method of claim 1, wherein causing the plug-in to attempt to execute the second applet includes causing the plug-in to attempt to execute the second applet after a first specified time period after causing the plug-in to attempt to execute the first applet and causing the plug-in to attempt to execute the fourth applet includes causing the plug-in to attempt to execute the fourth applet after a second specified time period after causing the plug-in to attempt to execute the third applet.

6. The method of claim 1, further comprising:
generating a third file that includes the first result;
generating a fourth file that includes the second result;
after causing the plug-in to attempt to execute the first applet and the second applet, generating a first intermediate file that includes the first result and the second result, based on the third file and the fourth file;
generating a fifth file that includes the third result;
generating a sixth file that includes the fourth result;
after causing the plug-in to attempt to execute the third applet and the fourth applet, generating a second intermediate file that includes the third result and the fourth result, based on the fifth file and the sixth file; and
based on the first intermediate file and the second intermediate file, generating a final file that includes the first result, the second result, the third result, and the fourth result.

7. The method of claim 1:
wherein accessing the first data structure includes accessing the first data structure that identifies the first test for the first applet of the plurality of applets, the second test for the second applet of the plurality of applets, the plug-in, and the application; and
wherein accessing the second data structure includes accessing the second data structure that identifies the third test for the third applet of the plurality of applets, the fourth test for the fourth applet of the plurality of applets, the plug-in, and the application.

8. The method of claim 1, wherein the first file is stored on a persistent storage device and the second file is stored on the persistent storage device.

9. The method of claim 8, wherein the first file is a first hypertext markup language (HTML) file, the second file is a second HTML file, accessing the first data structure includes accessing the first HTML file using a browser application, and accessing the second data structure includes accessing the second HTML file using the browser application.

10. The method of claim 1, further comprising:
obtaining data that identifies the plurality of applets, the plug-in, and the application;
wherein accessing the first data structure includes accessing the first data structure based on the data; and
wherein accessing the second data structure includes accessing the second data structure based on the data.

11. The method of claim 10, wherein obtaining the data includes obtaining the data from a user.

12. The method of claim 11, wherein obtaining the data from the user comprises obtaining the data from the user via a command line interface.

13. The method of claim 11, wherein obtaining the data from the user comprises obtaining the data from the user via a graphical user interface.

14. The method of claim 10, wherein obtaining the data includes obtaining the data from a persistent storage device.

15. The method of claim 10, wherein the data further identifies an operating environment to be used when causing the plug-in to attempt to execute the first applet, the second applet, the third applet, and the fourth applet.

16. The method of claim 10, wherein the data further identifies a particular version of the plug-in and a particular version of the application to be used when causing the plug-in to attempt to execute the first applet, the second applet, the third applet, and the fourth applet.

17. The method of claim 10, wherein the data further identifies an operating system and a hardware platform to be used when causing the plug-in to attempt to execute the first applet, the second applet, the third applet, and the fourth applet.

18. The method of claim 1, wherein:
the plug-in is a Java Plug-in;
the application is a browser application; and
the plurality of applets is a plurality of Java applets.

19. The method of claim 1, wherein:
causing the plug-in to attempt to execute the first applet comprises causing the plug-in to attempt to execute the first applet using a first instance of the application;
causing the plug-in to attempt to execute the second applet comprises causing the plug-in to attempt to execute the second applet using a second instance of the application;
causing the plug-in to attempt to execute the third applet comprises causing the plug-in to attempt to execute the third applet using a third instance of the application; and
causing the plug-in to attempt to execute the fourth applet comprises causing the plug-in to attempt to execute the fourth applet using a fourth instance of the application.

20. The method of claim 19, wherein a fifth instance of the application causes the plug-in to attempt to execute both the first applet and the second applet and a sixth instance of the application causes the plug-in to attempt to execute both the third applet and the fourth applet.

21. The method of claim 20, wherein the application is a first application, and the method further comprises:
executing a second application that invokes the fifth instance of the first application and the sixth instance of the first application.

22. The method of claim 21, further comprising:
executing a third application that invokes the second application;
wherein the third application kills the first instance, the second instance, and the fifth instance of the first application when a first criterion is satisfied;
the first criterion being satisfied is selected from the group consisting of (a) whether a first particular file that indicates completion of both the first test and the second test is identified and (b) when a first timer exceeds a first specified value;
wherein the third application kills the third instance, the fourth instance, and the sixth instance of the first application when a second criterion is satisfied, and
the second criterion being satisfied is selected from the group consisting of (a) whether a second particular file that indicates completion of both the third test and the fourth test is identified and (b) when a second time exceeds a second specified value.

23. The method of claim 22, wherein:
the third application is a shell-based application;
the second application is a Java-based application; and
the first application is an Internet browser application.

24. The method of claim 1, further comprising:
generating a third file that includes a first report based on the first result and the second result;
generating a fourth file that includes a second report based on the third result and the fourth result; and
generating a fifth file that includes a third report based on the first report and the second report.

25. The method of claim 24, wherein the application is a first application, and the method further comprises:
causing a second application to generate the third report based on the first report and the second report.

26. The method of claim 1, wherein:
the first applet is associated with a first test case;
the second applet is associated with a second test case;
the third applet is associated with a third test case;
the fourth applet is associated with a fourth test case;
the first group is associated with a first test suite; and
the second group is associated with a second test suite.

27. A computer-readable storage medium having stored thereon instructions which, when executed by one or more processors, cause the one or more processors to test execution of applets with plug-ins and applications, said computer-readable medium comprising:
instructions for causing one or more processors to access a first data structure that identifies a first test for a first applet of a plurality of applets and a second test for a second applet of the plurality of applets;
instructions for causing one or more processors to cause a plug-in that executes with an application to attempt to execute the first applet, based on the first data structure that identifies the first test;
instructions for causing one or more processors to cause the plug-in that executes with the application to attempt to execute the second applet, based on the first data structure that identifies the second test;
instructions for causing one or more processors to generate, after causing the plug-in to attempt to execute the first applet, a first result based on the attempt of the plug-in to execute the first applet;
instructions for causing one or more processors to generate, after causing the plug-in to attempt to execute the second applet, a second result based on the attempt of the plug-in to execute the second applet;
instructions for causing one or more processors to access a second data structure that identifies a third test for a third applet of the plurality of applets and a fourth test for a fourth applet of the plurality of applets, wherein the second data structure does not identify the first test for the first applet and the second test for the second applet, and wherein the first data structure does not identify the third test for the third applet and the fourth test for the fourth applet;
instructions for causing one or more processors to cause the plug-in that executes with the application to attempt to execute the third applet, based on the second data structure that identifies the third test;
instructions for causing one or more processors to cause the plug-in that executes with the application to attempt to execute the fourth applet, based on the second data structure that identifies the fourth test;
instructions for causing one or more processors to generate, after causing the plug-in to attempt to execute the third applet, a third result based on the attempt of the plug-in to execute the third applet;
instructions for causing one or more processors to generate, after causing the plug-in to attempt to execute the fourth applet, a fourth result based on the attempt of the plug-in to execute the fourth applet;
wherein:
the first applet and the second applet are included in a first group of applets in the plurality of applets;

the third applet and the fourth applet are included in a second group of applets in the plurality of applets; and the computer-readable medium further comprises instructions for causing one or more processors to access a third data structure that identifies the first data structure and the second data structure;

wherein said instructions for causing one or more processors to access the first data structure comprise instructions for causing one or more processors to access the first data structure based on the third data structure; and wherein said instructions for causing one or more processors to access the second data structure comprise instructions for causing one or more processors to access the second data structure based on the third data structure;

wherein the first data structure is a first file and the second data structure is a second file, and the computer-readable medium further comprises:

instructions for causing one or more processors to retrieve the first file that identifies the first test for the first applet and the second test for the second applet in the first group;

instructions for causing one or more processors to retrieve the second file that identifies the third test for the third applet and the fourth test for the fourth applet in the second group; and instructions for causing one or more processors to retrieve a third data structure that identifies the plug-in and the application.

28. The computer-readable storage medium of claim 27, wherein:

the first result specifies whether the attempt of the plug-in to execute the first applet satisfies a first set of one or more criteria;

the second result specifies whether the attempt of the plug-in to execute the second applet satisfies a second set of one or more criteria;

the third result specifies whether the attempt of the plug-in to execute the third applet satisfies a third set of one or more criteria; and the fourth result specifies whether the attempt of the plug-in to execute the fourth applet satisfies a fourth set of one or more criteria.

29. The computer-readable storage medium of claim 28, wherein:

the first set of one or more criteria is satisfied when the first applet is executed successfully;

the second set of one or more criteria is satisfied when the second applet is executed successfully;

the third set of one or more criteria is satisfied when the third applet is executed successfully; and the fourth set of one or more criteria is satisfied when the fourth applet is executed successfully.

30. The computer-readable storage medium of claim 29, wherein the first applet includes the first set of one or more criteria, the second applet includes the second set of one or more criteria, the third applet includes the third set of one or more criteria, and the fourth applet includes the fourth set of one or more criteria.

31. The computer-readable storage medium of claim 27, wherein said instructions for causing one or more processors to cause the plug-in to attempt to execute the second applet comprise instructions for causing one or more processors to cause the plug-in to attempt to execute the second applet after a first specified time period after causing the plug-in to attempt to execute the first applet and causing the plug-in to attempt to execute the fourth applet includes causing the plug-in to attempt to execute the fourth applet after a second specified time period after causing the plug-in to attempt to execute the third applet.

32. The computer-readable storage medium of claim 27, further comprising:

instructions for causing one or more processors to generate a third file that includes the first result;

instructions for causing one or more processors to generate a fourth file that includes the second result;

instructions for causing one or more processors to generate, after causing the plug-in to attempt to execute the first applet and the second applet, a first intermediate file that includes the first result and the second result, based on the third file and the fourth file;

instructions for causing one or more processors to generate a fifth file that includes the third result;

instructions for causing one or more processors to generate a sixth file that includes the fourth result;

instructions for causing one or more processors to generate, after causing the plug-in to attempt to execute the third applet and the fourth applet, a second intermediate file that includes the third result and the fourth result, based on the fifth file and the sixth file; and instructions for causing one or more processors to generate a final file that indicates that the first result, the second result, the third result, and the fourth result, based on the first intermediate file and the second intermediate file.

33. The computer-readable storage medium of claim 27:

wherein said instructions for causing one or more processors to access the first data structure comprise instructions for causing one or more processors to access the first data structure that identifies the first test for the first applet of the plurality of applets, the second test for the second applet of the plurality of applets, the plug-in, and the application; and wherein said instructions for causing one or more processors to access the second data structure comprise instructions for causing one or more processors to access the second data structure that identifies the third test for the third applet of the plurality of applets, the fourth test for the fourth applet of the plurality of applets, the plug-in, and the application.

34. The computer-readable storage medium of claim 27, wherein the first file is stored on a persistent storage device and the second file is stored on the persistent storage device.

35. The computer-readable storage medium of claim 34, wherein the first file is a first hypertext markup language (HTML) file, the second file is a second HTML file, said instructions for causing one or more processors to access the first data structure includes instructions for causing one or more processors to access the first HTML file using a browser application, and said instructions for causing one or more processors to access the second data structure includes instructions for causing one or more processors to access the second HTML file using the browser application.

36. The computer-readable storage medium of claim 27, further comprising:

instructions for causing one or more processors to obtain data that identifies the plurality of applets, the plug-in, and the application;

wherein said instructions for causing one or more processors to access the first data structure comprise instructions for causing one or more processors to access the first data structure based on the data; and wherein said instructions for causing one or more processors to access the second data structure comprise instructions for causing one or more processors to access the second data structure based on the data.

37. The computer-readable storage medium of claim 36, wherein said instructions for causing one or more processors to obtain the data comprise instructions for causing one or more processors to obtain the data from a user.

38. The computer-readable storage medium of claim 37, wherein said instructions for causing one or more processors to obtain the data from the user comprise instructions for causing one or more processors to obtain the data from the user via a command line interface.

39. The computer-readable storage medium of claim 37, wherein said instructions for causing one or more processors to obtain the data from the user comprise instructions for causing one or more processors to obtain the data from the user via a graphical user interface.

40. The computer-readable storage medium of claim 36, wherein said instructions for causing one or more processors to obtain the data comprise instructions for causing one or more processors to obtain the data from a persistent storage device.

41. The computer-readable storage medium of claim 36, wherein the data further identifies an operating environment to be used when causing the plug-in to attempt to execute the first applet, the second applet, the third applet, and the fourth applet.

42. The computer-readable storage medium of claim 36, wherein the data further identifies a particular version of the plug-in and a particular version of the application to be used when causing the plug-in to attempt to execute the first applet, the second applet, the third applet, and the fourth applet.

43. The computer-readable storage medium of claim 36, wherein the data further identifies an operating system and a hardware platform to be used when causing the plug-in to attempt to execute the first applet, the second applet, the third applet, and the fourth applet.

44. The computer-readable storage medium of claim 27, wherein:
the plug-in is a Java Plug-in;
the application is a browser application; and
the plurality of applets is a plurality of Java applets.

45. The computer-readable storage medium of claim 27, wherein:
said instructions for causing one or more processors to cause the plug-in to attempt to execute the first applet comprise instructions for causing one or more processors to cause the plug-in to attempt to execute the first applet using a first instance of the application;
said instructions for causing one or more processors to cause the plug-in to attempt to execute the second applet comprise instructions for causing one or more processors to cause the plug-in to attempt to execute the second applet using a second instance of the application;
said instructions for causing one or more processors to cause the plug-in to attempt to execute the third applet comprise instructions for causing one or more processors to cause the plug-in to attempt to execute the third applet using a third instance of the application; and
said instructions for causing one or more processors to cause the plug-in to attempt to execute the fourth applet comprise instructions for causing one or more processors to cause the plug-in to attempt to execute the fourth applet using a fourth instance of the application.

46. The computer-readable storage medium of claim 45, wherein a fifth instance of the application causes the plug-in to attempt to execute both the first applet and the second applet and a sixth instance of the application causes the plug-in to attempt to execute both the third applet and the fourth applet.

47. The computer-readable storage medium of claim 46, wherein the application is a first application, and the computer-readable medium further comprises:
instructions for causing one or more processors to execute a second application that invokes the fifth instance of the first application and the sixth instance of the first application.

48. The computer-readable storage medium of claim 47, further comprising:
instructions for causing one or more processors to execute a third application that invokes the second application;
wherein the third application kills the first instance, the second instance, and the fifth instance of the first application when a first criterion is satisfied;
the first criterion being satisfied is selected from the group consisting of (a) whether a first particular file that indicates completion of both the first test and the second test is identified and (b) when a first timer exceeds a first specified value;
wherein the third application kills the third instance, the fourth instance, and the sixth instance of the first application when a second criterion is satisfied, and
the second criterion being satisfied is selected from the group consisting of (a) whether a second particular file that indicates completion of both the third test and the fourth test is identified and (b) when a second time exceeds a second specified value.

49. The computer-readable storage medium of claim 48, wherein:
the third application is a shell-based application;
the second application is a Java-based application; and
the first application is an Internet browser application.

50. The computer-readable storage medium of claim 27, further comprising:
instructions for causing one or more processors to generate a third file that includes a first report based on the first result and the second result;
instructions for causing one or more processors to generate a fourth file that includes a second report based on the third result and the fourth result; and
instructions for causing one or more processors to generate a fifth file that includes a third report based on the first report and the second report.

51. The computer-readable storage medium of claim 50, wherein the application is a first application, and the computer-readable medium further comprises:
instructions for causing one or more processors to cause a second application to generate the third report based on the first report and the second report.

52. The computer-readable storage medium of claim 27, wherein:
the first applet is associated with a first test case;
the second applet is associated with a second test case;
the third applet is associated with a third test case;
the fourth applet is associated with a fourth test case;
the first group is associated with a first test suite; and
the second group is associated with a second test suite.

* * * * *